United States Patent
Toumura et al.

(10) Patent No.: US 7,606,148 B2
(45) Date of Patent: Oct. 20, 2009

(54) PACKET FORWARDING APPARATUS

(75) Inventors: Kunihiko Toumura, Hachioji (JP); Toshiaki Suzuki, Kunitachi (JP); Hideki Okita, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 11/285,363

(22) Filed: Nov. 23, 2005

(65) Prior Publication Data

US 2006/0114899 A1    Jun. 1, 2006

(30) Foreign Application Priority Data

Nov. 30, 2004    (JP) .............................. 2004-345803

(51) Int. Cl.
*H04J 1/16* (2006.01)
(52) U.S. Cl. ...................... 370/229; 370/392
(58) Field of Classification Search ................ 370/254, 370/401, 392, 229
See application file for complete search history.

(56) References Cited

U.S. PATENT DOCUMENTS

| 7,289,537 B1 * | 10/2007 | Devanagondi et al. ...... 370/474 |
| 7,298,752 B2 | 11/2007 | Moriwaki et al. |
| 2002/0150088 A1 | 10/2002 | Yoshino et al. |
| 2004/0184453 A1 | 9/2004 | Moriwaki |

FOREIGN PATENT DOCUMENTS

| EP | 1 365 546 A1 | 5/2002 |
| JP | 2004-135106 | 10/2002 |
| JP | 2004-289223 | 3/2003 |

OTHER PUBLICATIONS

Office Action from the Japanese Patent Office dated May 12, 2009, in Japanese.

* cited by examiner

*Primary Examiner*—Dang T Ton
*Assistant Examiner*—Li Zhou
(74) *Attorney, Agent, or Firm*—Stites & Harbison, PLLC; Juan Carlos A. Marquez, Esq.

(57) ABSTRACT

In a packet forwarding apparatus having a plurality of interfaces for connection to external networks, at least one of the interfaces is designated as an extension interface, and an extension apparatus having an additional function is connected to the packet forwarding apparatus via the extension interface. An ingress packet having been received by another of the network interfaces and for which the additional function is to be used is forwarded to the extension apparatus and the ingress packet processed with the additional function is inputted again to the packet forwarding apparatus via the extension interface and sent out to a corresponding external network from a network interface corresponding to the destination address of the ingress packet.

7 Claims, 16 Drawing Sheets

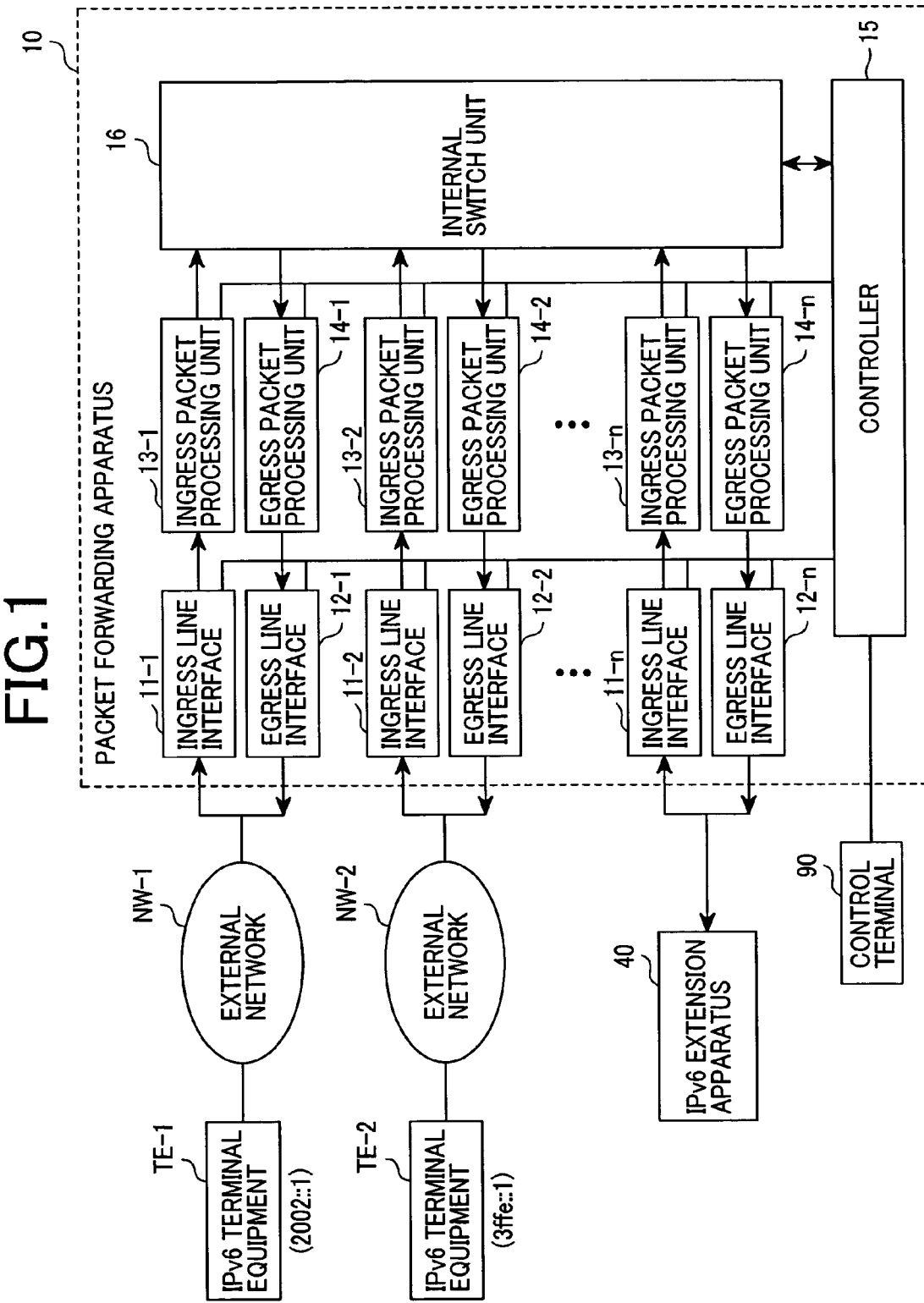

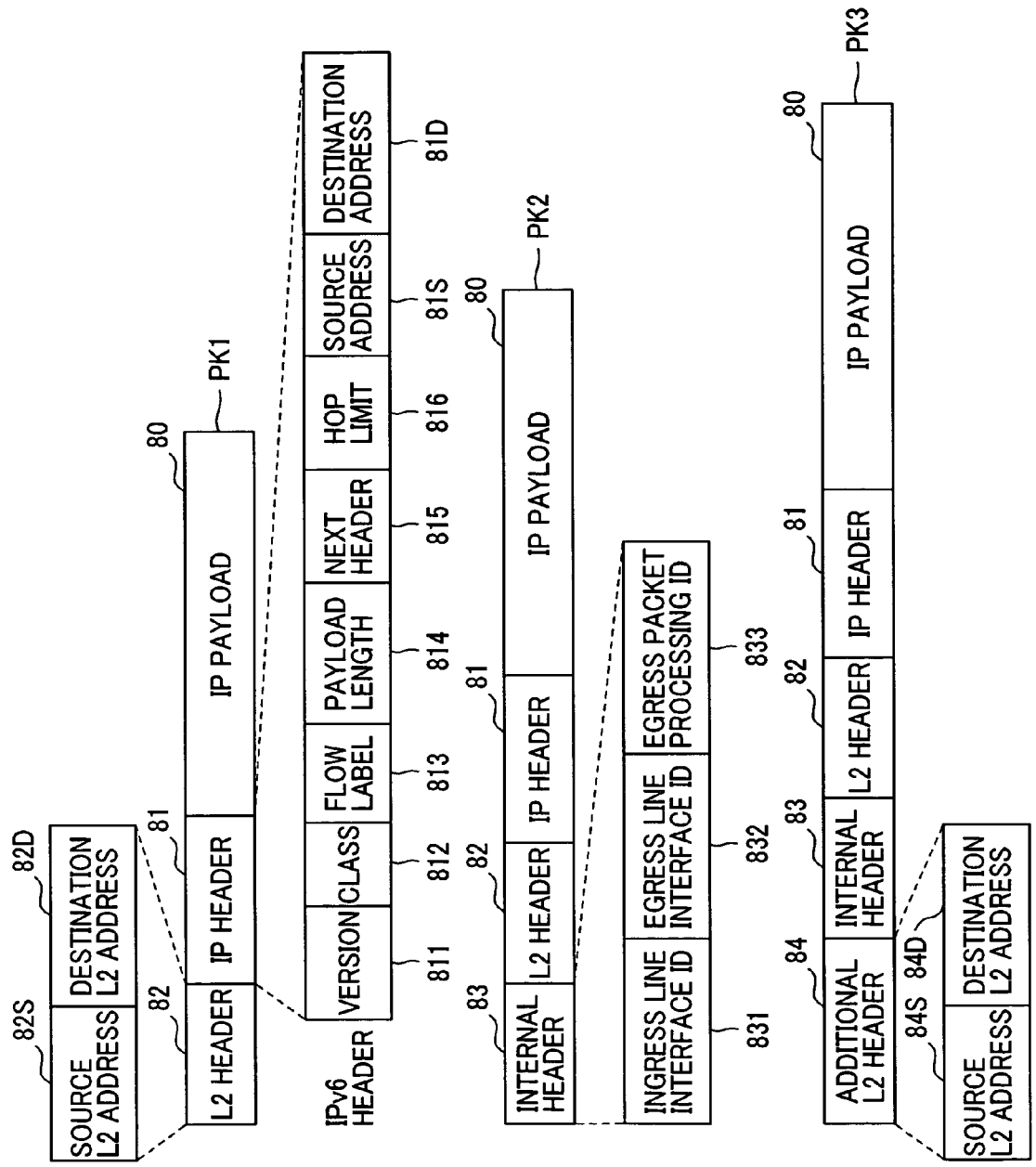

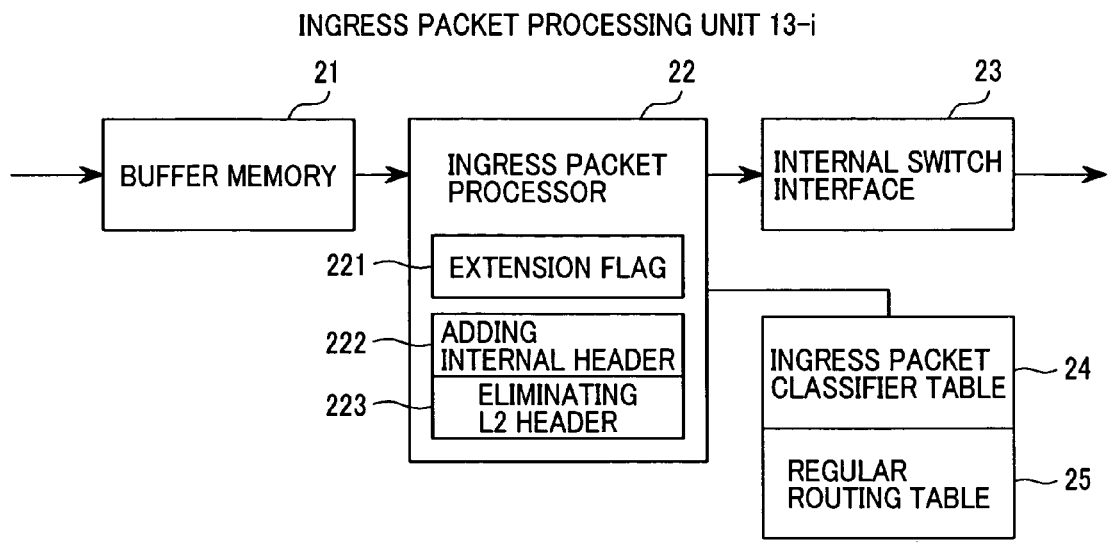

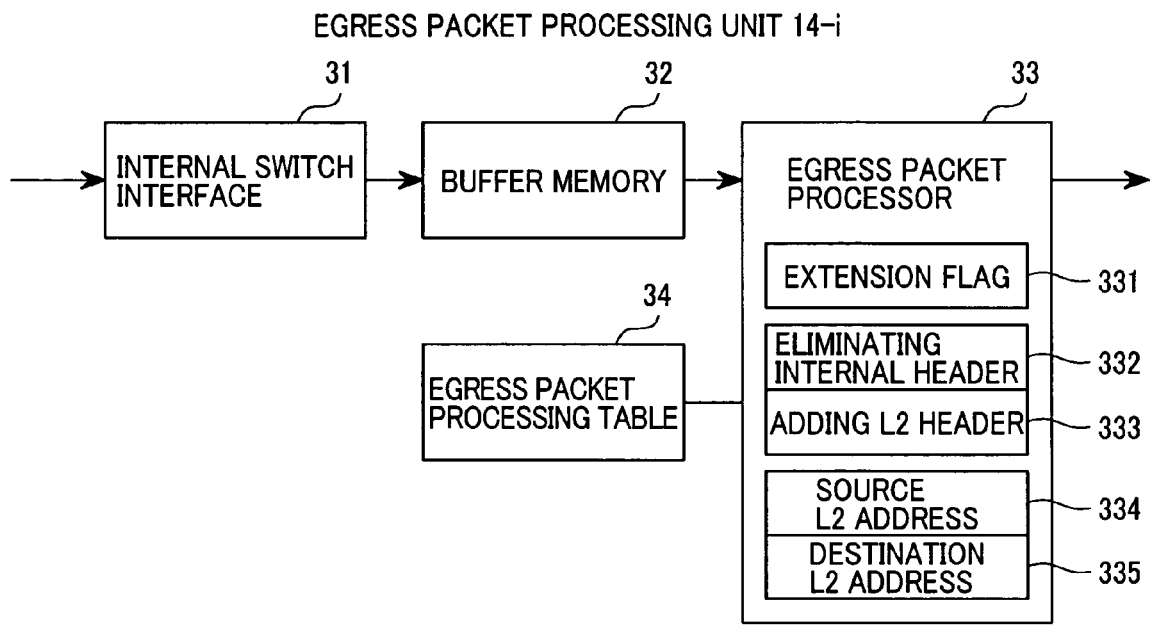

IPv6 EXTENSION APPARATUS 40

INGRESS PACKET CLASSIFIER TABLE 45

| INGRESS LINE INTERFACE ID (451) | L2 ADDRESS (452) | |
|---|---|---|
| 1 | 66:77:88:99:AA:BB | 450-1 |
| 2 | CC:DD:EE:FF:00:11 | 450-2 |
| 3 | 01:23:45:67:89:AB | 450-3 |
| ⋮ | ⋮ | ⋮ |
| n | 89:AB:CD:EF:01:23 | 450-n |

FIG.11

IPv6 ROUTING TABLE 46

| DESTINATION IPv6 ADDRESS | NEXTHOP EGRESS LINE INTERFACE ID | DESTINATION L2 ADDRESS | |
|---|---|---|---|
| 2001::/16 | 2 | FF:EE:DD:CC:BB:AA | 460-1 |
| 2001:240::/32 | 2 | 99:88:77:66:55:44 | 460-2 |
| 2002::/16 | 1 | 33:22:11:00:FF:EE | 460-3 |
| 2001:240:420::/48 | 3 | DD:CC:BB:AA:99:88 | 460-4 |
| 3ffe::/16 | 2 | FE:DC:BA:98:76:54 | 460-5 |
| OTHER | 1 | 32:10:FE:DC:BA:98 | 460-6 |

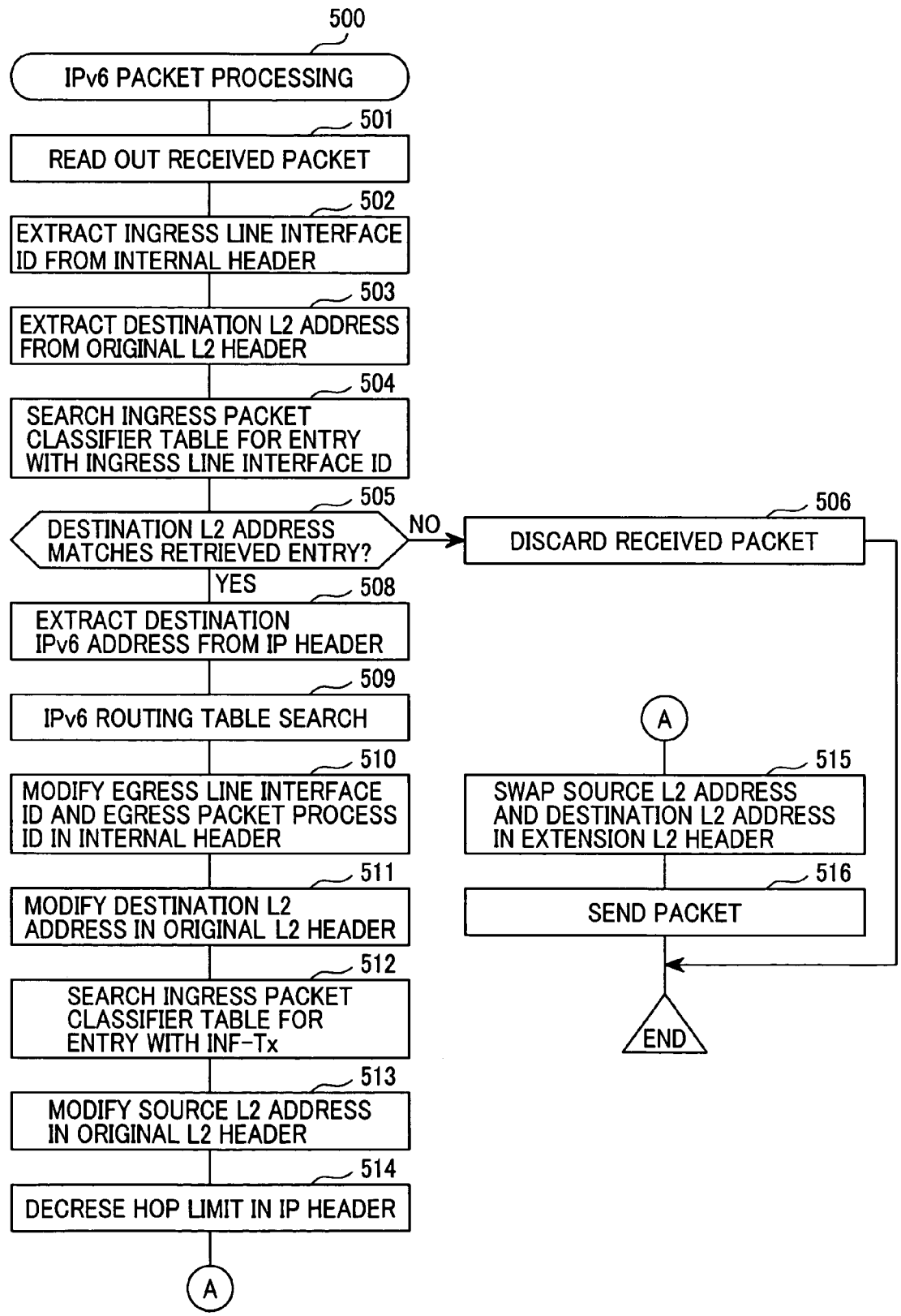

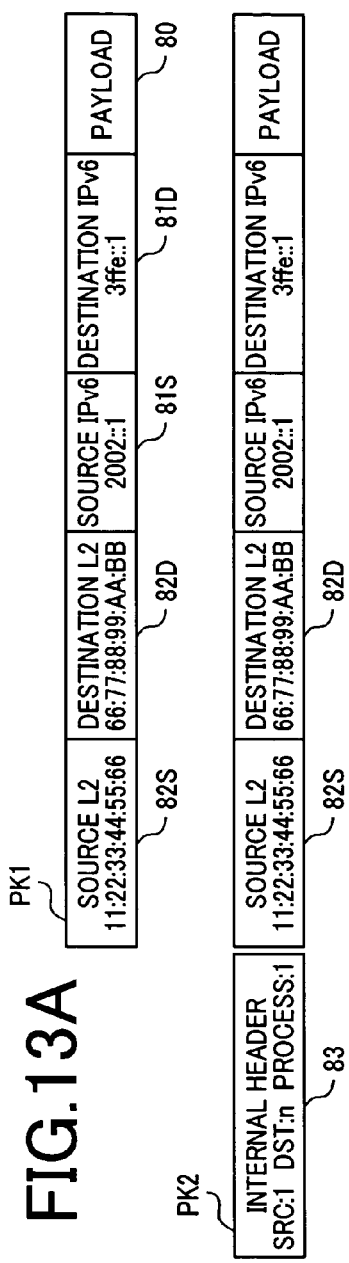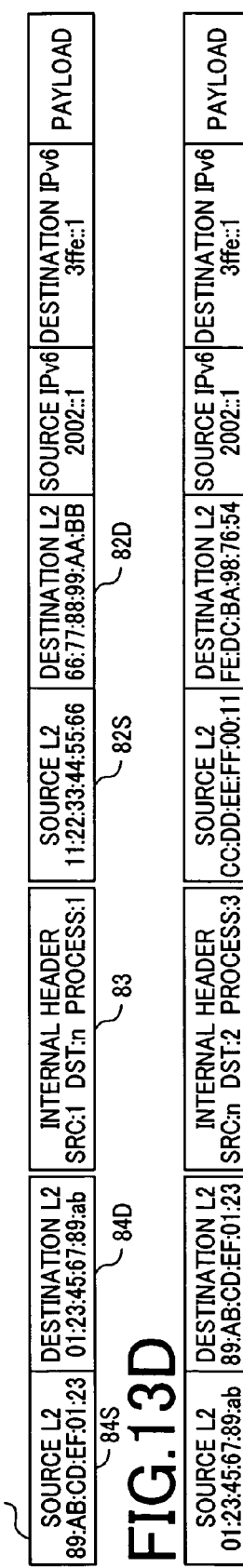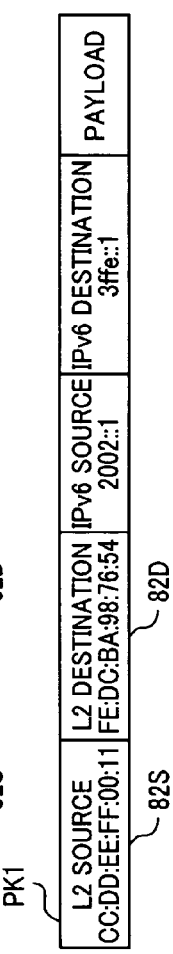

IPv6 EXTENSION APPARATUS 40

SWITCHING TABLE 47

| SOURCE L2 ADDRESS 471 | TABLE ID 472 | |
|---|---|---|
| 00:11:22:33:44:55 | 1 | 470-1 |
| 66:77:88:99:aa:bb | 2 | 470-2 |
| 01:23:45:67:89:ab | 3 | 470-3 |
| ⋮ | ⋮ | ⋮ |

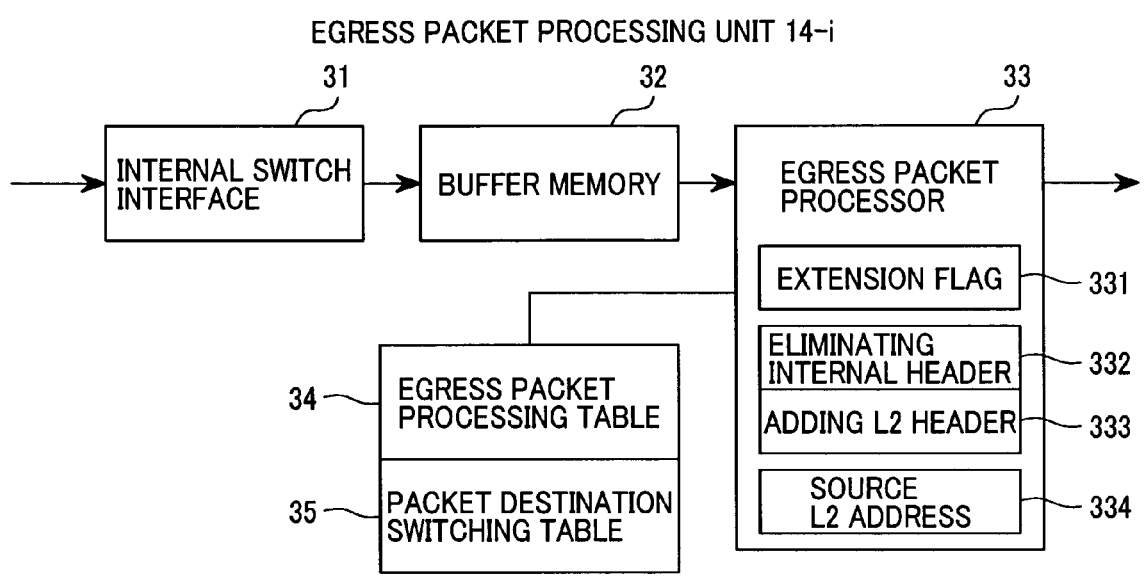

EXTENSION FLAG TABLE 150

PACKET FORWARDING APPARATUS

CLAIM OF PRIORITY

The present application claims priority from Japanese application serial No. 2004-345803, filed on Nov. 30, 2004, the content of which is hereby incorporated by reference into this application.

BACKGROUND OF THE INVENTION (1) Field of the Invention

The present invention relates to a packet forwarding apparatus and, more particularly, to a system configuration for extending the function of the packet forwarding apparatus.

(2) Description of Related Art

A packet communication network such as an IP network is composed of a plurality of packet forwarding apparatus for relaying packets. A packet transmitted from a terminal device reaches destination terminal equipment or a server via these packet forwarding apparatuses. Each of the packet forwarding apparatus refers to a routing table in accordance with a destination address included in the header of an ingress packet received from each of input lines and specifies an output line onto which the ingress packet is to be forwarded. After performing a proper updating process with respect to the header information of the ingress packet, the packet forwarding apparatus transmits the ingress packet to the next packet forwarding apparatus via the specified output line.

There are restraints on the ability of a conventional packet forwarding apparatus to process ingress packets. When the processing ability needs to be greatly modified, it is necessary to replace the whole packet forwarding apparatus with a new apparatus. Since the replacement with the new packet forwarding apparatus requires a large equipment investment, it becomes difficult to frequently change the network function in compliance with user needs.

As one solution to the above problem, it is practical to design such a structure that allows the function of a packet forwarding apparatus to be extended to a degree so as to partly modify the packet forwarding apparatus or add a new functional board thereto when necessity demands. For example, Japanese Unexamined Patent Publication No. 2002-281072 (US 2002/0150088 A1: Patent Document 1) proposes an inter-network apparatus and an inter-network method that enable functional extension by replacing a network interface card connected to the internal switch of a packet forwarding apparatus with a functional extension card.

In accordance with the extension system proposed in Patent Document 1, however, it is necessary to newly develop hardware for the network interface to be connected to the maker-specific internal switch provided in the packet forwarding apparatus and to perform a component exchange with an existing packet forwarding apparatus. Although this system is lower in cost than in the case where the whole packet forwarding apparatus is replaced with a new model, the provision of the new interface board demands an expert understanding on the hardware of the packet forwarding apparatus so that the design and prototyping of the hardware requires still high cost. In addition, there are also size-related constraints on the new interface board for the replacement of an existing board therewith.

SUMMARY OF THE INVENTION

An object of the present invention is to provide a packet forwarding apparatus of a structure with which addition of a new extended function becomes easy without modifying existing hardware.

Another object of the present invention is to provide a packet forwarding apparatus of a structure with which addition of plural types of new extended functions becomes easy.

Still another object of the present invention is to provide a packet forwarding apparatus of a structure capable of sharing a new extended function to be added thereto with another packet forwarding apparatus.

To attain the objects described above, one characteristic feature of a packet forwarding apparatus according to the present invention is to designate at least one of a plurality of versatile network interfaces each for connection to an external network as an extension interface, connect an extension apparatus having an additional function to the packet forwarding apparatus via the extension interface, forward ingress packets, which have been received by the other network interfaces and for which the additional function is to be used, to the extension apparatus, input again the ingress packet processed with the extended function to the packet forwarding apparatus via the extension interface, and transmits the ingress packet to the external network from one of the network interfaces corresponding to the destination address of the ingress packet.

More specifically, each of the network interfaces is comprised of an ingress line interface and an egress line interface and the packet forwarding apparatus according to the present invention is comprised of ingress packet processing units provided in association with the individual ingress line interfaces, a plurality of egress packet processing units provided in association with the individual egress line interfaces, and an internal packet forwarding unit for forwarding an output packet from each of the ingress packet processing units to that one of the egress packet processing units specified by a next-hop identifier included in an internal header. Each of the egress packet processing units converts the ingress packet received from the corresponding ingress line interface to an internal packet having an internal header including the identifier of the ingress line interface and a next-hop identifier and sends out the internal packet to the internal packet forwarding unit.

Another characteristic feature of the present invention resides in that each of the ingress packet processing units provided in association with the network interfaces other than the extension interface has the function of adding an internal header specifying the extension interface with the next-hop identifier to the ingress packet which matches pre-specified header conditions and sending out the ingress packet having the internal header as the internal packet to the internal packet forwarding unit, the egress packet processing unit provided in association with the extension interface adds an external network header including the address of the extension apparatus as the destination address to the internal packet received from the internal packet forwarding unit, sends out the internal packet having the external network header as an egress packet to the egress line interface, and the ingress packet processing unit provided in association with the extension interface eliminates the external network header from a packet, which is received from the corresponding ingress line interface and having been processed in the extension apparatus, and sends out the packet as the internal packet to the internal packet forwarding unit.

To allow the extension apparatus to process the ingress packet in place of each of the ingress packet processing units of the packet forwarding apparatus, additional information indicating the attribute of the ingress packet such as, e.g., an ingress interface identifier becomes necessary in addition to the header information of the ingress packet. However, since each of the ingress packet processing units provided in association with the network interfaces other than the extension interface adds the internal header including the attribute of the packet needed by the extension apparatus to the ingress packet to be forwarded to the extension apparatus and the egress packet processing unit provided in association with the extension interface sends out the egress packet in a form obtained by adding an external network header to the internal packet to a corresponding egress line interface, the present invention allows the extension apparatus to perform packet processing based on the attribute of the ingress packet and the header information thereof.

The extension apparatus performs routing processing on the ingress packet based on the internal header information of the ingress packet and the packet header information thereof and returns the packet subjected to header conversion to the extension interface of the packet forwarding apparatus. In the present invention, the ingress packet processing unit provided in association with the extension interface eliminates the external network header from the packet received from the corresponding ingress line interface and sends out the internal packet having an internal header subjected to the header conversion in the extension apparatus and an internal header and the packet header to the internal packet forwarding unit. Accordingly, the internal packet can be forwarded to an egress packet processing unit corresponding to the destination address of the ingress packet in accordance with the next-hop identifier indicated by the internal header and transmitted to the external network in a format from which the internal header has been eliminated.

The present invention allows the function of the packet forwarding apparatus to be extended by using the extension apparatus connected via the versatile network interface. As the extension apparatus, various apparatuses each having a versatile network interface such as, e.g., a server and a network processor can be used depending on a function to be achieved.

BRIEF DESCRIPTION OF THE DRAWINGS

FIG. 1 is a view showing an embodiment of a packet forwarding apparatus 10 according to the present invention;

FIG. 2A is a view showing the format of a packet PK1 to be communicated between the packet forwarding apparatus 10 and external networks NW (MW-1 and NW-2) in FIG. 1;

FIG. 2B is a view showing the format of an internal packet PK2 to be transferred in the packet forwarding apparatus 10;

FIG. 2C is a view showing the format of a packet PK3 to be communicated between the packet forwarding apparatus 10 and an extension apparatus 40;

FIG. 3 is a detailed view of an ingress packet processing unit 13-*i* in the packet forwarding apparatus 10;

FIG. 4 is a view showing an example of an ingress packet classifier table 24 provided in the ingress packet processing unit 13-*i*;

FIG. 6 is a detailed view of an egress packet processing unit 14-*i*;

FIG. 7 is a view showing an example of an egress packet processing table 34 provided in the egress packet processing unit 14-*i*;

FIG. 11 is a view showing an example of an IPv6 routing table 46 provided in the IPv6 extension apparatus 40;

FIG. 12 is a flow chart of an IPv6 packet processing routine 500 to be executed by an IPv6 routing unit 44 in the IPv6 extension apparatus 40;

FIGS. 13A to 13F are views showing a process of modification of the header of an IPv6 packet in the system configuration of FIG. 1;

FIG. 18 is a view showing a structure of the egress packet processing unit 14-*i* of the packet forwarding apparatus 10 shown in FIG. 17;

FIG. 19 is a view showing an example of a packet destination switching table 35 provided in the egress packet processing unit 14-*i* of FIG. 17;

DESCRIPTION OF PREFERRED EMBODIMENTS

Figure 5:
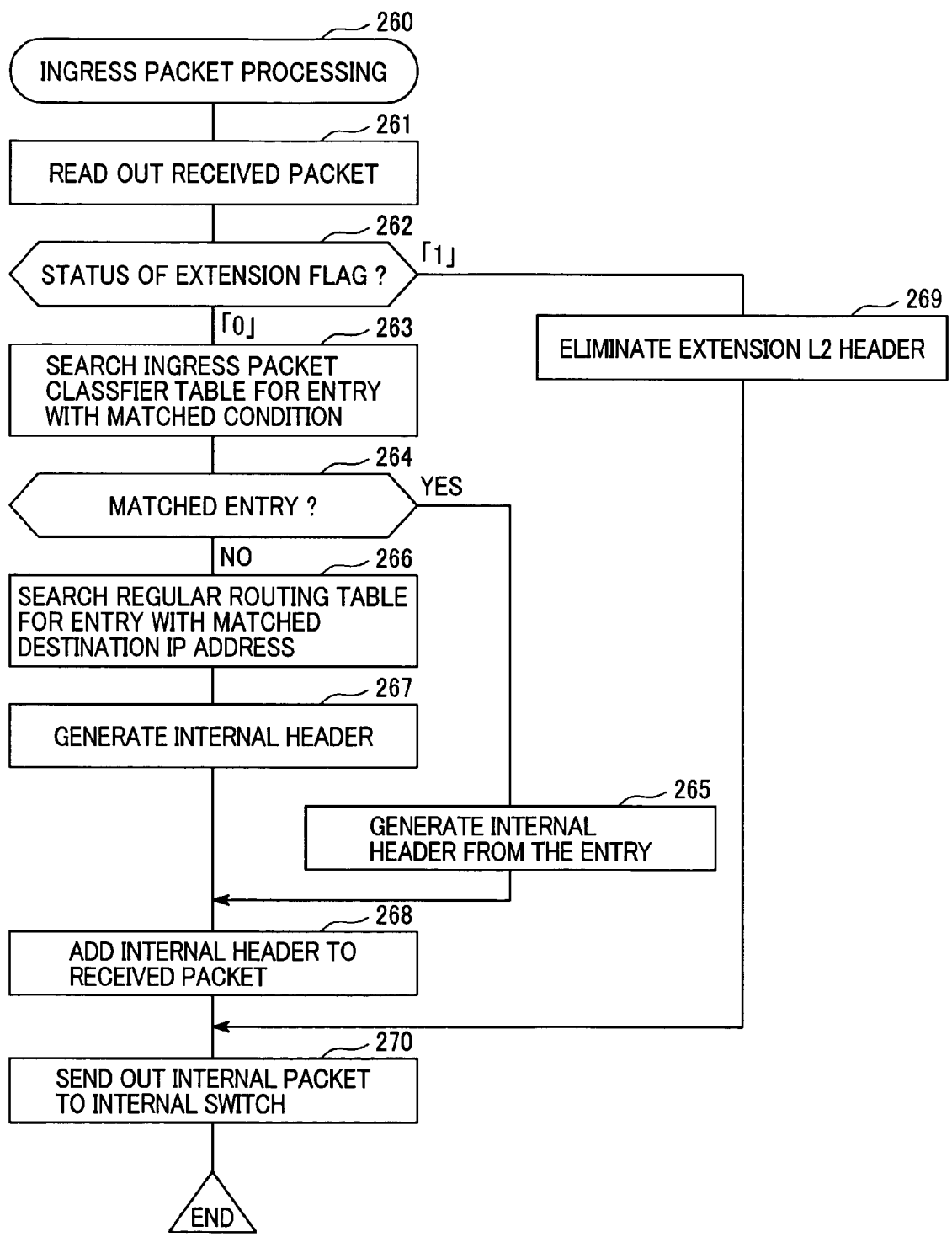
FIG. 5 is a flow chart of an ingress packet processing routine 260 to be executed by an ingress packet processor 22 in the ingress packet processing unit 13-*i*.

Referring now to the drawings, the embodiments of the present invention will be described herein below.

Embodiment 1

As a first embodiment of the present invention, a description will be given to the configuration and operation of a system in the case where an IPv6 routing function is added to a packet forwarding apparatus having a IPv4 packet routing function by connecting an IPv6 extension apparatus thereto via one of network interfaces.

FIG. 1 shows an embodiment of the packet forwarding apparatus 10 according to the present invention.

The packet forwarding apparatus 10 is comprised of a plurality of ingress line interfaces 11 (11-1 to 11-*n*), a plurality of egress line interfaces 12 (12-1 to 12-*n*), a plurality of ingress packet processing units 13 (13-1 to 13-*n*) connected to the ingress line interfaces 11, a plurality of egress packet processing units 14 (14-1 to 14-*n*) connected to the egress line interfaces 12, a controller 15, and an internal packet forwarding unit 16 to which the ingress packet processing units 13, the egress packet processing units 14 and the controller 15 are connected. Numeral 90 denotes control terminal equipment connected to the controller 15.

Although the description will be given here to a structure adopting, as the internal packet forwarding unit 16, an internal switch for routing packets received from each of the ingress packet processing units 13 in accordance with the internal header thereof, the packet forwarding apparatus according to the present invention can also adopt a bus-type internal packet forwarding unit in which each of the ingress packet processing units 13 sends out an ingress packet with an internal header onto an internal bus and each of the egress packet processing units 14 selectively receives a packet addressed thereto from the internal bus. There is no particular limit to the structure of the internal packet forwarding unit.

The ingress line interface 11-$i$ and the egress line interface 12-$i$ ($i$=1 to n), which are paired with each other, form one of the network interfaces. Each of the network interfaces is connected to the corresponding one of external networks NW (NW-1, NW-2, . . . ) or to an IPV6 extension apparatus 40. The present embodiment assumes that each of the network interfaces communicates IP packets each having a layer-2 header as a header for external network with the external network NW or the IPv6 extension apparatus 40.

In the example shown in the drawing, the IPv6 extension apparatus 40 is connected to the packet forwarding apparatus 10 via the n-th network interface (the ingress line interface 11-$n$ and the egress line interface 12-$n$). The network interface connected to the external network NW is assumed to have a regular routing function with respect to IPv4 packets received from the external network NW and charge the IPv6 extension apparatus 40 with routing processing with respect to IPv6 packets.

The ingress packet processing unit 13-$j$ ($j$=1 to n−1) adds an internal header to a packet having the L2 header, which was received by the ingress line interface 11-$j$ from the external network NW, and inputs the packet in the form of an internal packet to the internal switch unit. As will be described later in detail, each packet to be communicated between the IPv6 extension apparatus 40 and the n-th network interface has a peculiar packet format obtained by adding another L2 header to a packet having the internal packet format. Accordingly, the ingress packet processing unit 13-$n$ inputs internal packets obtained by eliminating the L2 header from the packets received by the ingress line interface 11-$n$ from the IPv6 extension apparatus 40 to the internal switch unit 16.

The internal switch unit 16 forwards the internal packet received from each of the ingress packet processing units 13 to that one of the egress packet processing units 14 specified by internal header information. The egress packet processing unit 14-$j$ ($j$=1 to n−1) associated with the external network NW eliminates the internal header that has become unnecessary from the internal packet received from the internal switch unit 16 and sends out the resultant IP packet with the L2 header to the external network NW via the egress line interface 12-$j$ ($j$=1 to n−1). On the other hand, the egress packet processing unit 14-$n$ associated with the IPv6 extension apparatus 40 adds a new L2 header specifying the IPv6 extension apparatus 40 with a destination L2 address to the internal packet received from the internal switch unit 16 and sends out the resultant packet having the new L2 header to a connection line for the IPv6 extension apparatus 40 via the egress line interface 12-$n$.

FIG. 2A shows the format of a packet PK1 to be communicated between the network interface composed of the ingress line interface 11-$j$ and the egress line interface 12-$j$ ($j$=1 to n−1) and the external network NW.

The packet PK1 is comprised of an IP payload 80, an IP header 81 in the IPv4 version or in the IPv6 version, and an L2 header 82. In the case where the IP header 81 is in, e.g., the IPv6 version, it includes a version 811, a class 812, a flow label 813, a payload length 814, the type of a next header 815, a hop limit (the limit number of relayings) 816, a 128-bit source IP address 81S, and a 128-bit destination IP address 81D. The L2 header 82 includes a source L2 address 82S and a destination L2 address 82D.

FIG. 2B shows an example of the format of an internal packet PK2 to be inputted to the internal switch unit 16.

The internal packet PK2 is obtained by adding an internal header 83 to the leading head of the packet PK1. In the present embodiment, the internal header 83 includes an ingress line interface identifier (ID) 831 indicating an ingress line for a packet, an egress line interface identifier (ID) 832 indicating an egress line for the packet, and an egress packet processing ID 833 for specifying a process to be performed in that one of the egress packet processing units 14 that has received the packet from the internal switch unit 16. The internal switch unit 16 forwards each of the internal packets PK2 received from each of the ingress packet processing units 13 to that one of the egress packet processing units 14 specified by the egress line interface ID 832 included in the internal header.

FIG. 2C shows the format of a packet PK3 to be communicated between the network interface composed of the ingress line interface 11-$n$ and the egress line interface 12-$n$ and the IPv6 extension apparatus 40.

The packet PK3 has a format obtained by adding a new L2 header 84 including a source L2 header 84S and a destination L2 header 84D to the leading head of the internal packet PK2. In the following description, the L2 headers 84 and 82 will be referred to as an extension L2 header and an original L2 header, respectively.

FIG. 3 shows the ingress packet processing unit 13-$i$ ($i$=1 to n) in detail.

The ingress packet processing unit 13-$i$ is comprised of a buffer memory for temporarily storing packets received from the ingress line interface 11-I, an ingress packet processor 22 for converting the ingress packets to internal packets, and an internal switch interface 23 for forwarding the internal packet sent out of the ingress packet processor 22 to the input port of the internal switch unit 16.

The ingress packet processor 22 has a register 221 for storing a flag (hereinafter referred to as an extension flag) serving as identification information on whether or not the ingress line interface 11-$i$ is a regular interface (hereinafter referred to as the regular INF) connected to the external network NW or an interface (hereinafter referred to as the extension INF) connected to the IPv6 extension apparatus 40 and performs ingress packet processing, which differs depending on the status of the extension flag. As will be described later, each of the egress packet processing units 14 also has an extension flag register 331. In the following description, the extension flag "1" assumedly indicates that each of the ingress line interface 11-$k$ and the egress line interface 12-$k$ is the extension INF connected to the extension apparatus, which is the IPv6 extension apparatus 40 in FIG. 1, and the extension flag "0" assumedly indicates that each of the ingress line interface 11-$k$ and the egress line interface 12-$k$ is the regular INF connected to the external network NW.

In the initial status, the extension flag="0" has been set in each of the registers 221 and 331 of the individual network interfaces. The setting of extension flag="1" is performed by the controller 15 in response to an operator instruction from the control terminal equipment 90. Specifically, the administrator of the packet forwarding apparatus 10 instructs the controller 15, specifying the identifier (which is "n" in the example of FIG. 1) of the network interface connected to the extension apparatus from the control terminal equipment 90, to set the extension flag to each of the corresponding ingress packet processing unit and the corresponding egress packet processing unit. In response to the instruction, the controller 15 writes "1" into each of the extension flag registers of the ingress packet processing unit 13-n and the egress packet processing unit 14-n each having the specified identifier "n".

By referring to the extension flag, each of the ingress packet processing unit 13 and the egress packet processing unit 14 judges whether the packet received of transmitted by the network interface is from or to the extension apparatus.

The ingress packet processor 22 has an internal header adding function 222 of generating, when the extension flag shown by the register 221 is in the "0" status, an internal header in accordance with an ingress packet classifier table 24 or a regular routing table 25 and converting the ingress packet PK1 read out from the buffer memory 21 to the internal packet PK2 and also has an L2 header eliminating function 223 of eliminating, when the extension flag is in the "1" status, the extension L2 header 84 from the ingress packet PK3 read out from the buffer memory 21 and converting the ingress packet PK3 to the internal packet PK2.

FIG. 4 shows an example of the ingress packet classifier table 24.

In the ingress packet classifier table 24, one or a plurality of table records 240 (240-1, 240-2, . . . ) have been registered. Each of the table records 240 indicates the relationships among identification conditions 241 for an ingress packet to be subjected to extended processing, i.e., an ingress packet to be forwarded to the IPv6 extension apparatus 40, an identifier 242 of the next-hop interface of the ingress packet which matches the conditions, and an egress packet processing ID 243.

When the network has the system configuration shown in FIG. 1, only one IPv6 extension apparatus 40 is connected as the extension apparatus to the packet forwarding apparatus 10 so that the ingress packet classifier table 24 needs only the table entry 240-1 which indicates identification conditions for an IPv6 packet with the packet conditions for extended processing 241, specifies the egress line interface 12-n with the next-hop interface ID 242, and specifies packet processing to be performed by the egress packet processing unit 14-n with the egress packet processing ID 243.

For example, if an extension apparatus for a PPPoE packet is connected as another extension apparatus for packets other than an IPv6 packet to each of the ingress line interface 11-i and the egress line interface 12-i, a table entry which indicates identification conditions for the PPPoE packet with the packet conditions for extended processing 241, specifies the egress line interface 12-i with the next-hop interface ID 242, and specifies packet processing to be performed by the egress packet processing unit 14-i with the egress packet processing ID 243 is added to the ingress packet classifier table 24, as shown by the table entry 240-2.

It is also possible to connect a plurality of extension apparatus each having the same function, e.g., a plurality of IPv6 apparatus to the packet forwarding apparatus 10. In this case, the IPv6 packets may be divided appropriately into groups based on the packet conditions for extended processing 241 and the network interfaces which differ from one group to another may be specified appropriately with the next-hop interface IDs 242.

FIG. 5 shows a flow chart of an ingress packet processing routine 260 to be executed by the ingress packet processor 22 when an ingress packet is stored in the buffer memory 21.

The ingress packet processor 22 reads out the ingress packet from the buffer memory 21 (Step 261) and determines the status of the extension flag shown by the register 221 (Step 262). When the extension flag is "0", the ingress packet has the format of the packet PK1 shown in FIG. 2A. In this case, the ingress packet processor 22 searches the ingress packet classifier table 24 to judge whether the header information of the ingress packet matches the packet conditions for extended processing 241 in any of the table entries (Step 263).

When the ingress packet has matched the packet conditions for extended processing 241 in any of the table entries as a result of searching the ingress packet classifier table, the IP header 81 of the ingress packet is in a version, which is the IPv6 header in the configuration of FIG. 1, other than the IPv4 version which does not allow routing by the ingress packet processor 22. In this case, the ingress packet processor 22 generates an internal header 83 including the next-hop interface ID 242 and the egress packet processing ID 243 each shown by the retrieved table entry as the egress line interface ID 832 and the egress packet processing ID 833, respectively (Step 265). To the ingress line interface ID 831 of the internal header 83, the value of internal identifier of a network interface, the identifier of the ingress line to which the ingress packet has been inputted, pre-specified to the ingress packet processor 22 is set.

When the ingress packet does not match the packet conditions for extended processing 241 in any of the table entries, the ingress packet processor 22 judges that the ingress packet is an IPv4 packet routable by itself and searches the regular routing table 25 for an entry which matches the destination IP address of the ingress packet (Step 266). In the regular routing table 25, a plurality of table entries each indicating the relationships among the destination IP address, the egress line interface ID, and the egress packet processing ID have been registered.

The ingress packet processor 22 generates an internal header 83 including the egress line interface ID and the egress packet processing ID each shown by the entry retrieved from the regular routing table 25 as the egress line interface ID 832 and the egress packet processing ID 833, respectively (Step 267). To the ingress line interface ID 831 of the internal header 83, the value of the internal identifier of the pre-specified network interface is set. Thereafter, the ingress packet processor 22 adds the internal header 83 generated in Step 165 or 266 to the ingress packet PK1 (Step 268) and sends out the ingress packet PK1 as the internal packet PK2 to the internal switch interface 23 (Step 270).

When the extension flag is "1" in Step 262, on the other hand, the ingress packet is in the format of the packet PK3 shown in FIG. 2C. In this case, the ingress packet processor 22 converts the ingress packet PK3 to the internal packet format shown in FIG. 2B by eliminating the extension L2 header 84 from the ingress packet (Step 269) and sends out the internal packet to the internal switch interface 23 (Step 270).

FIG. 6 shows the egress packet processing unit 14-i (i=1 to n) in detail.

The egress packet processing unit 14-i is comprised of an internal switch interface 31 for receiving internal packets from the output port of the internal switch unit 16, a buffer memory 32 for temporarily storing the internal packets received by the internal switch interface 31, and an egress packet processor 33 for converting the internal packet read out from the buffer memory 32 to the packet PK1 shown in FIG. 2A or to the packet PK3 shown in FIG. 2C.

The egress packet processor 33 is provided with a register 331 for storing the extension flag, an internal header eliminating function 332 of eliminating the internal header 83 that has become unnecessary from the internal packet PK2 to convert the internal packet PK2 to the packet PK1, an L2 header adding function 333 of generating an extension L2 header 84 in accordance with the egress packet processing table 34 and converting the internal packet PK2 to the packet PK3 having the extension L2 header, a source L2 address register 334, and a destination L2 address register 335. The source L2 address register 334 indicates the value of an L2 address allocated to the egress packet processing unit 14-$i$. The destination L2 address register 335 indicates the value of the L2 address of the extension apparatus to which the ingress packet is to be forwarded and becomes valid when the extension flag is "1".

FIG. 7 shows an example of the egress packet processing table 34.

In the egress packet processing table 34, at least one table entry 340 (340-1, 340-2, ... ) which indicates the relationship between an egress packet processing ID 341 and contents of process 342 has been registered. In the example shown here, the contents of process 342 indicates an address value to be used as the destination L2 address 82D of the L2 header 82. The egress packet processing table 34 also includes an entry which specifies "no address modification" as the contents of process 342, such as an entry 340-3.

Figure 8:
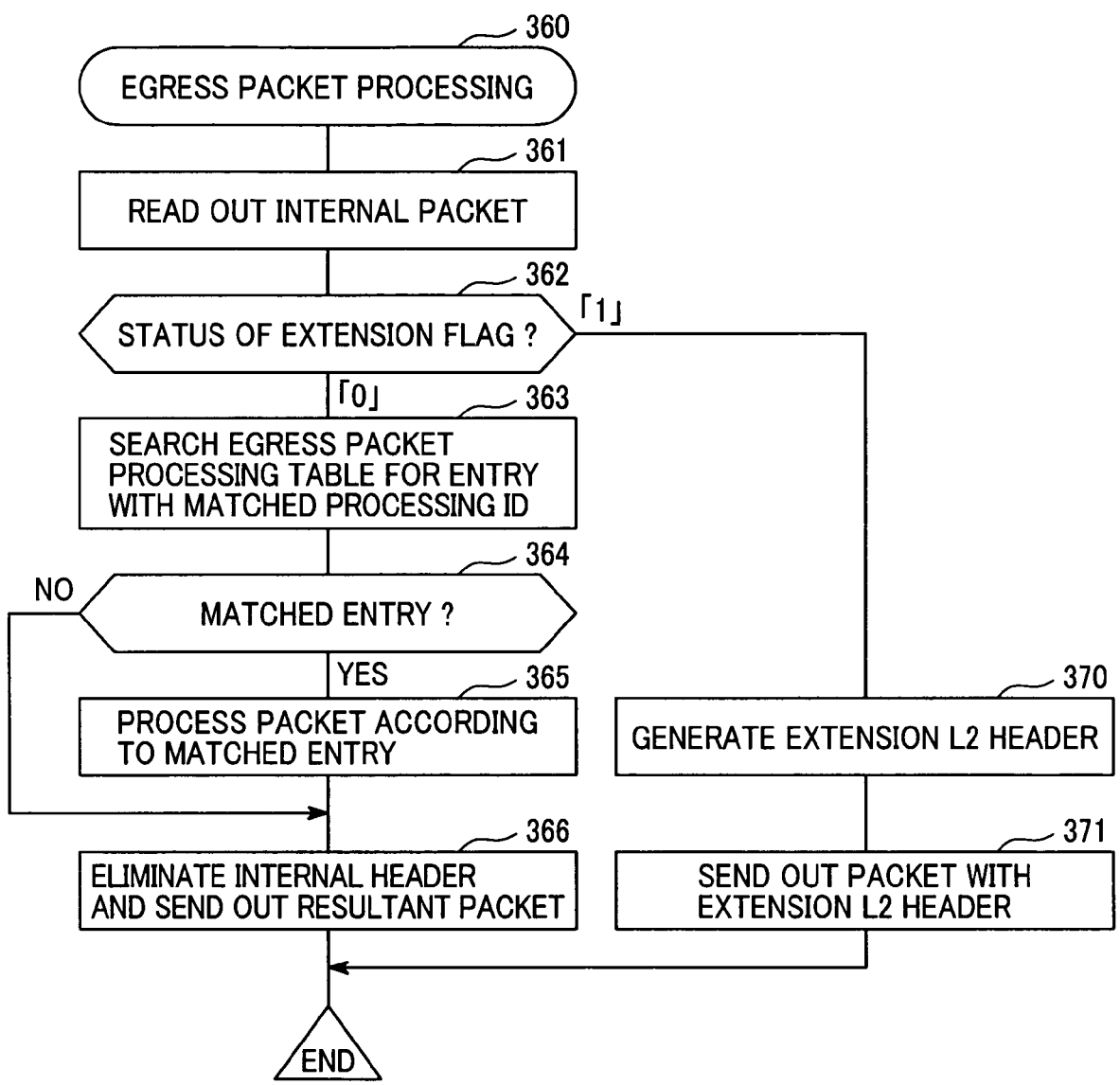
FIG. 8 is a flow chart of an egress packet processing routine 360 to be executed by an egress packet processor 33 in the egress packet processing unit 14-*i*.

FIG. 8 shows a flow chart of an egress packet processing routine 360 to be executed by the egress packet processor 33 when an internal packet is stored in the buffer memory 32.

The egress packet processor 33 reads out the internal packet PK2 from the buffer memory 32 (Step 361) and determines the status of the extension flag stored in the register 331 (Step 362).

When the extension flag is "0", i.e., when the egress packet processor 33 belongs to the egress packet processing unit 14-$i$ connected to the regular INF, the egress packet processor 33 searches the egress packet processing table 34 for an entry based on the egress packet processing ID 833 indicated in the internal header 83 of the internal packet PK2 (Step 362).

When the entry which matches the egress packet processing ID 833 is retrieved from the egress packet processing table 34 (Step 364), the egress packet processor 33 converts the destination L2 address 82D included in the original L2 header of the internal packet PK2 in accordance with the contents of process 342 of the retrieved entry and replaces the source L2 address with the source L2 address specified by the register 334 (Step 365). If the contents of process 342 of the retrieved entry indicates no need for address modification as indicated by, e.g., the entry 340-3, the conversion of the L2 address described above is not performed.

Thereafter, the egress packet processor 33 eliminates the internal header 84 from the internal packet PK2 and sends out the resultant packet as the packet PK1 to the egress line interface 12-$i$ (Step 366). When the entry which matches the egress packet processing ID 833 is not found in the egress packet processing table 34, the egress packet processor 33 eliminates the internal header 84 without converting the original L2 header and sends out the packet PK1 to the egress line interface 12-$i$ (Step 366).

When the extension flag is "1" in Step 362, the egress packet processor 33 generates an extension L2 header 84 including the respective L2 addresses specified by the registers 334 and 335 as the source L2 address 84S and the destination L2 address 84D (Step 370), converts the internal packet PK2 to the packet PK3 having the extension L2 header, and sends out the packet PK3 to the egress line interface 12-$i$ (Step 371). In this case, the ingress packet is forwarded to the extension apparatus, maintaining the respective statuses of the original L2 header 82 and the internal header 83 in the packet.

A description will be given next to the structure and operation of the IPv6 extension apparatus 40 connected to the extension INF.

Figures 9, 10:
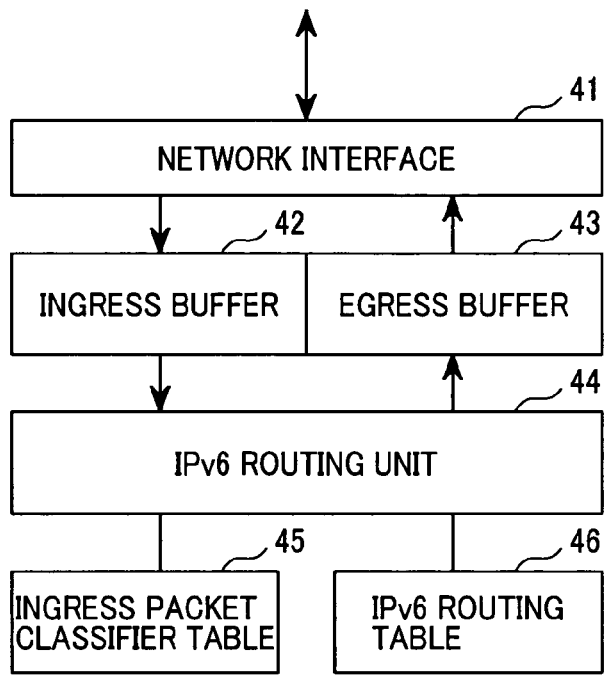
FIG. 9 is a view showing an embodiment of an IPv6 extension apparatus 40.
FIG. 10 is a view showing an example of an ingress packet classifier table 45 provided in the IPv6 extension apparatus 40.

FIG. 9 shows the IPv6 extension apparatus 40 in detail.

The IPv6 extension apparatus 40 is comprised of a network interface 41 for connecting with the packet forwarding apparatus 10 via the network, an ingress buffer 42 connected to the network interface 41, an egress buffer 43 also connected to the network interface 41, and an IPv6 routing unit 44 connected to each of the buffers. The IPv6 routing unit 44 is provided with an ingress packet classifier table 45 and an IPv6 routing table 46.

FIG. 10 shows an example of the ingress packet routing table 45.

In the ingress packet classifier table 45, a plurality of entries 450 (450-1 to 450-$n$) each indicating the relationship between the ingress line interface ID 451 and the L2 address 452 have been registered.

FIG. 11 shows an example of the IPv6 routing table 46.

In the IPv6 routing table 46, a plurality of entries 460-1, 460-2, . . . each indicating the relationships among a destination IPv6 address 461 to be included in one of the ingress packets, an identifier (ID) 462 of a next-hop egress line interface to which the ingress packet is to be sent out, and the destination L2 address to be added to a packet transmitted from the egress line interface have been registered.

FIG. 12 shows a flow chart of an IPv6 packet processing routine 500 to be executed by the IPv6 routing unit 44 when a packet PK3 received by the network interface 41 is stored in the ingress buffer 42.

In the ingress buffer 42, packets PK3 in the format obtained by adding the original L2 header 82, the internal header 83, and the extension header 84 to the IPv6 packet as shown in FIG. 2C is stored.

The IPv6 routing unit 44 reads out an ingress packet PK3 from the ingress buffer 42 (Step 501), extracts the value INF-ID (Rx) of the ingress line interface ID 831 from the internal header 83 (Step 502), and extracts the value L2-DST of the destination L2 address from the original L2 header 82 (Step 503). Then, the IPv6 routing unit 44 searches the ingress packet classifier table 45 for an entry by using the value INF-ID (Rx) of the ingress line interface ID as a search key (Step 504). As a result, an entry 450-$k$ having the ingress line interface ID 451 which matches the INF-ID (Rx) is retrieved and the value INF-L2 (Rx) of the L2 address 452 of the ingress line interface having received the packet in the packet forwarding apparatus 10 is recognized.

The IPv6 routing unit 44 then compares the address value INF-L2 (Rx) with the L2-DST (Step 505). When the address value INF-L2 (Rx) does not match the L2-DST, the IPv6 routing unit 44 judges that the ingress packet is not a packet to be routed in the packet forwarding apparatus 10 and discards the received packet (Step 506). When the address value INF-L2 (Rx) matches the L2-DST, the IPv6 routing unit 44 executes a process for IPv6 routing as follows.

In the IPv6 routing, the IPv6 routing unit 44 extracts the value of the destination IPv6 address 81D from the IPv6 header 81 (Step 508) and searches, by using the extracted value as a search key, the IPv6 routing table 46 for an entry through a longest prefix data matching with the destination IPv6 address 461 (Step 509). From a table entry 460-$k$ found as a result of the IPv6 routing table search, the value INF-Tx of the ID 462 of next-hop egress line interface to which the ingress packet is to be sent out and the value L2-Next of a destination L2 address 463 are recognized.

The IPv6 routing unit 44 modifies the egress line interface ID 832 of the internal header 83 to the INF-Tx such that the packet forwarding apparatus 10 can transmit the ingress packet from the proper egress line interface 12-*j*, modifies the egress packet processing ID 833 of the internal header 83 to a specified value (which is "3" in the example of the egress packet processing table shown in FIG. 7) such that the egress packet processing unit 14-*j* does not perform header conversion on the ingress packet received (Step 510), and modifies the destination L2 address 81D of the original L2 header 82 to the L2-Next such that the packet transmitted by the packet forwarding apparatus 10 from the egress line interface 12-*j* correctly reaches the next-hop apparatus (Step 511).

After that, the IPv6 routing unit 44 searches the ingress packet classifier table 45 for an entry by using the INF-Tx as a search key (Step 512) and modifies the source L2 address 82S of the original L2 header 82 to an address value specified by the L2 address 452 of the entry retrieved from the ingress packet classifier table 45 (Step 513). In order to show that the ingress packet has passed through the packet forwarding apparatus 10, the IPv6 routing unit 44 subtracts only 1 from the value of the hop limit 816 in the IPv6 header 81 (Step 514).

To return the ingress packet having the IPv6 header 81, the original L2 header 82, and the internal header 83 each having been modified to the packet forwarding apparatus 10, the IPv6 routing unit 44 swaps the destination L2 address 84D and the source L2 address 84S in the extension L2 header 84 to each other (Step 515) and sends out the packet PK3 to the egress buffer 43 (Step 516). The packet PK3 is transmitted to the packet forwarding apparatus 10 via the network interface 41.

The packet forwarding apparatus 10 receives the packet PK3 returned from the IPv6 extension apparatus 40 by the ingress line interface 11-*n* and processes the packet PK3 in accordance with the ingress packet processing routine 260 illustrated in FIG. 5. In this case, since the extension flag is "1", the ingress packet processing unit 13-*n* connected to the ingress line interface 11-*n* eliminates the extension L2 header 84 from the packet PK3 and inputs the resultant internal packet PK2 to the internal switch unit 16.

The internal packet PK2 is forwarded to an egress packet processing unit 14-*j* specified by the egress line interface ID 832 indicated in the internal header 83. The egress packet processing unit 14-*j* eliminates the internal header 83 from the received internal packet PK2 such that the internal packet PK2 is converted to the packet PK1. The packet PK1 is transmitted to the external network NW-*j* via the egress line interface 12-*j*.

FIGS. 13A to 13F show, as a specific example of operation, a process of modification of the header of the IPv6 packet transmitted from the IPv6 terminal equipment TE-1 to the IPv6 terminal equipment TE-2, each shown in FIG. 1.

FIG. 13A shows the principal portion of the packet PK1 transmitted from the IPv6 terminal equipment TE-1. In the drawing, the source IP address 81S indicates the IPv6 address of the IPv6 terminal equipment TE-1 and the destination IP address 81D indicates the IPv6 address of the IPv6 terminal equipment TE-2. On the other hand, the source L2 address 82S indicates the L2 address of the IPv6 terminal equipment TE-1 and the destination L2 address 82S indicates the L2 address of the ingress line interface 11-1 of the packet forwarding apparatus 10.

The ingress packet processing unit 13-1 connected to the ingress line interface 11-1 processes the packet PK1 in accordance with the ingress packet processing routine 260 illustrated in FIG. 5. The ingress line interface 11-1 is the regular INF and the extension flag of the ingress packet processor 22 has been set to "0". Accordingly, the ingress packet processor 22 performs Step 263 where it successfully searches the ingress packet classifier table 24 for the table entry 240-1 for the IPv6 packet. The ingress packet processor 22 then performs Step 265 where it generates the internal header 83 including Egress Line Interface ID="n", Egress Packet Processing ID="1", and Ingress Line Interface ID="1" in accordance with the descriptive content of the retrieved table entry and sends out the internal packet PK2 generated in Step 268 and shown in FIG. 13B to the internal switch interface 23.

In FIG. 13B, the ingress line interface ID 831, the egress line interface ID 832, and the egress packet processing ID 833 of the internal header 83 are represented by "src", "dst", and "process", respectively, for the sake of clarity. The internal packet PK2 is forwarded by the internal switch unit 16 to the egress packet processing unit 14-*n* specified by the value "n" of the egress line interface ID 832.

The egress packet processing unit 14-*n* processes the ingress packet PK2 in accordance with the egress packet processing routine 360 illustrated in FIG. 8. Since the egress line interface 12-*n* connected to the egress packet processing unit 14-*n* is the extension INF, the extension flag of the egress packet processor 33 has been set to "1". Accordingly, the egress packet processor 33 generates an extension L2 header 84 in Step 370 and sends out the packet PK3 having the extension L2 header to the egress line interface 12-*n* in Step 371. As shown in FIG. 13C, the extension L2 header includes the L2 address of the egress line interface 12-*n* as the source L2 address 84S and the L2 address of the network interface of the IPv6 extension apparatus as the destination L2 address. These L2 addresses are obtained from the registers 334 and 335.

The packet PK3 is received by the network interface 41 of the IPv6 extension apparatus 40, stored in the ingress buffer 42, and processed by the IPv6 routing unit 44 in accordance with the IPv6 packet processing routine 500 illustrated in FIG. 12. The IPv6 routing unit 44 extracts the ingress line interface ID "1" from the internal header 83 of the ingress packet PK3 (Step 502) and extracts the value "66:77:88:99:AA:BB" of the destination L2 address 82D from the original L2 header 82 (Step 503). Then, as a result of searching the ingress packet classifier table 45, the IPv6 routing unit 44 recognizes that the L2 address which matches the ingress line interface ID "1" is "66:77:88:99:AA:BB" (Step 504). In the present example, the destination L2 address of the original L2 header 82 matches the value of the L2 address specified by the ingress packet classifier table 45. Accordingly, the IPv6 routing unit 44 judges that the packet is a correct one to be relayed by the packet forwarding apparatus 10 and executes the IPv6 routing process.

In Step 508, the IPv6 routing unit 44 extracts the value "3ffe::1" of the destination IPv6 address 81D from the IPv6 header 81. As a result of searching the IPv6 routing table 46 for an entry by using the extracted value "3ffe::1" as a search key in Step 509, the IPv6 routing unit 44 obtains the value "2" of the next-hop egress line interface ID 462 and the value "FE:DC:BA:98:76:54" of the destination L2 address 463 from the table entry 460-5 shown in FIG. 11. The IPv6 routing unit 44 modifies the ingress line interface ID 831, the egress line interface ID 832, and the egress packet processing ID 833 of the internal header 83 and the destination L2 address 82D of the original L2 header 82 in accordance with the result of the above table search and the already-known values of the interface ID and the egress packet processing ID (Steps 511 and 512), modifies the source L2 address 82S of the original L2 header in accordance with the L2 address "CC:DD:EE: FF:00:11" retrieved from the ingress packet processing table 45 (Steps 512 and 513), updates the hop limit 816 of the IPv6 header (Step 514), and then modifies the extension L2 header (Step 515).

By performing the IPv6 routing process described above, the ingress packet PK3 is converted to the packet PK3 shown in FIG. 13D and returned to the packet forwarding apparatus 10.

The packet PK3 having been subjected to the header conversion is received by the ingress line interface 11-*n* of the packet forwarding apparatus 10 and processed by the ingress packet processor 22 of the ingress packet processing unit 13-*n* in accordance with the ingress packet processing routine 260 shown in FIG. 5. Since the ingress line interface 11-*n* is the extension INF, the extension flag of the ingress packet processor 22 has been set to "1". Accordingly, the ingress packet processor 22 performs Step 268, eliminates the extension L2 header 84 from the ingress packet PK3, and sends out the internal packet PK2 in the format shown in FIG. 13E to the internal switch interface 23 (Step 270).

The internal packet PK2 is forwarded by the internal switch unit 16 to the egress packet processing unit 14-2 corresponding to the value "2" of the egress line interface ID 832 of the internal header 83. The internal packet PK2 received by the egress packet processing unit 14-2 is processed in accordance with the egress packet processing routine 360 of FIG. 8, which is executed by the egress packet processor 33.

Since the egress packet processing unit 14-2 is connected to the egress line interface 12-2 as the regular INF, the extension flag of the egress packet processor 33 has been set to "0". In this case, the egress packet processor 33 extracts the egress packet processing ID "3" from the internal header 83 and searches the egress packet processing table 34 for an entry by using the extracted egress packet processing ID "3" as a search key. According to the egress packet processing table 34 shown in FIG. 7, the table entry 340-3 is retrieved as a result of above table search.

The egress packet processor 33 judges "no address modification" for the current ingress packet from the contents of process 342 of the retrieved table entry, eliminates the internal header 83 from the ingress packet PK2 in Step 366 without performing anything in Step 365, and sends out the packet PK1 shown in FIG. 13F to the egress line interface 12-2. The packet PK1 is transmitted by the egress line interface 12-2 to the external network NW-2 and reaches the IPv6 terminal equipment TE-2 specified by the destination IPv6 address.

From the embodiment described above, it will be understood that the present invention allows substantial addition of the IPv6 routing function to the packet forwarding apparatus 10 having the IPv4 packet routing function, by connecting the IPv6 extension apparatus 40 thereto via one of the network interfaces and forwarding IPv6 packets received by the other network interfaces to the IPv6 extension apparatus 40 in accordance with the ingress packet classifier table 24.

Embodiment 2

Figure 14:
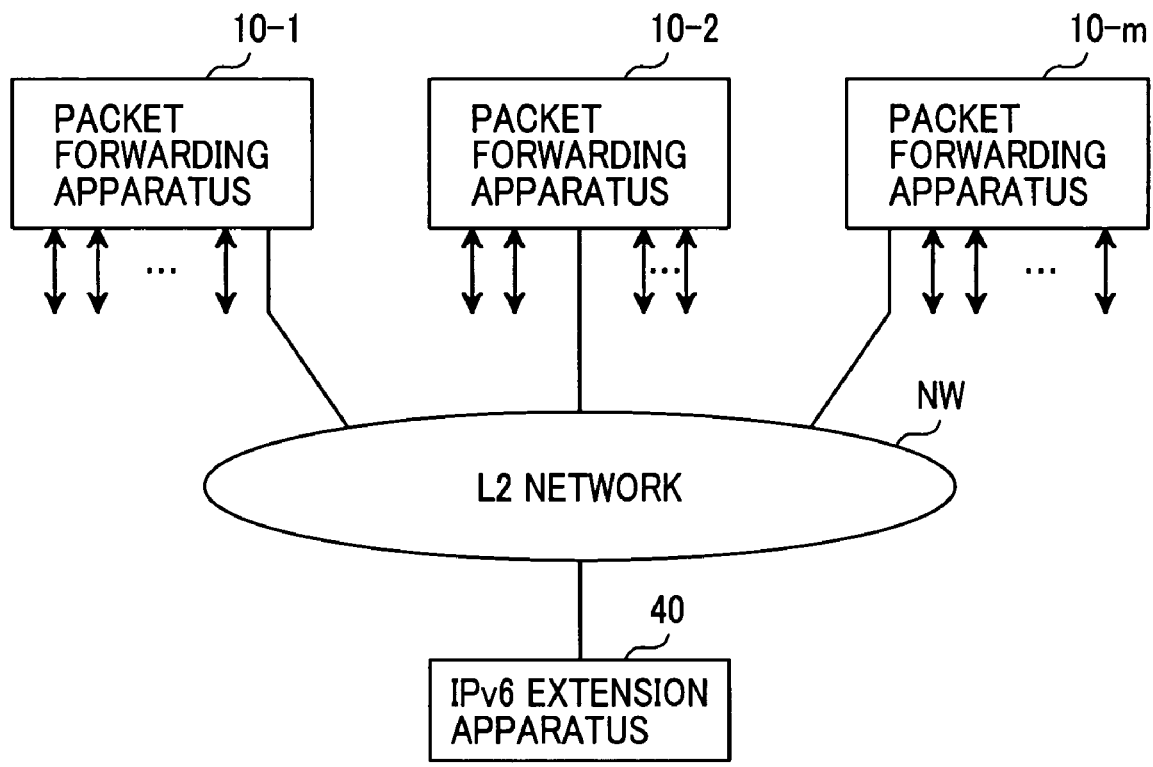
FIG. 14 is a view showing another example of the application of the IPv6 extension apparatus 40.

FIG. 14 shows another example of the application of the extension apparatus 40.

The second embodiment allows a significant reduction in system cost by causing a plurality of packet forwarding apparatus 10-1 to 10-*m* to share the same extension apparatus 40, compared with the case where each of the packet forwarding apparatus has a dedicated extension apparatus. In the example shown here, the packet forwarding apparatus 10-1 to 10-*m* each having the IPv4 packet routing function are connected to the shared IPv6 extension apparatus 40 via the L2 network NW-S. When an IPv6 ingress packet is received, each of the packet forwarding apparatus performs the process of routing the ingress packet by using the IPv6 extension apparatus 40, receives the packet having been subjected to header conversion from the IPv6 extension apparatus 40, and forwards the ingress packet to a proper network interface corresponding to the destination IPv6 address in the same manner as in Embodiment 1 described above.

Figure 15:
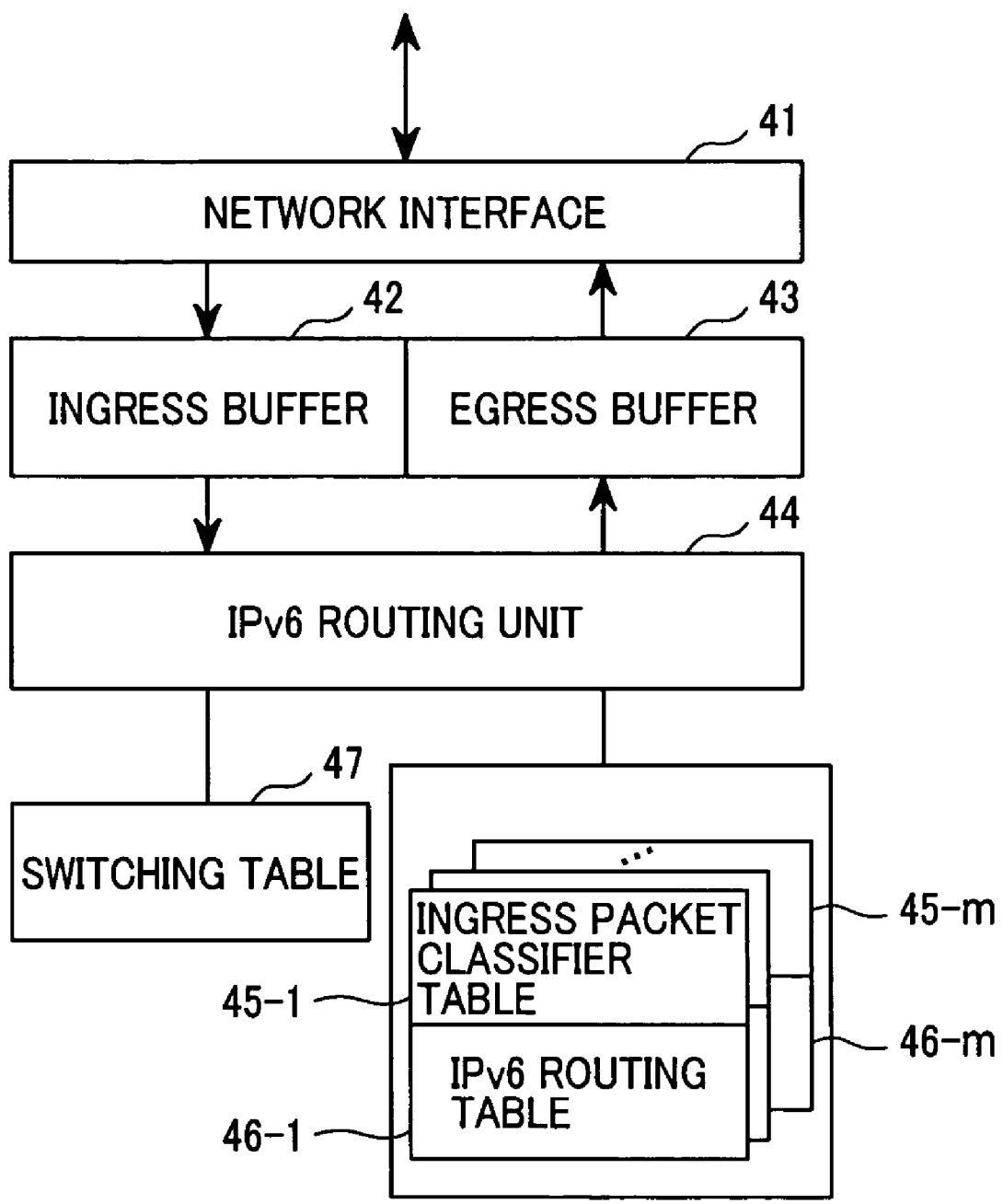
FIG. 15 is a view showing an embodiment of the IPv6 extension apparatus 40 shown in FIG. 14.

FIG. 15 shows an embodiment of the IPv6 extension apparatus 40 shared by the plurality of packet forwarding apparatus.

In order to switch the contents of process in accordance with the packet forwarding apparatus as a packet source, the shared IPv6 extension apparatus 40 has a IPv6 routing unit 44 provided with a switching table 47 and plural pairs of the ingress packet classifier tables 45-1 to 45-*m* and the IPv6 routing tables 46-1 to 46-*m* which correspond to the individual packet forwarding apparatus.

Figures 16, 17:
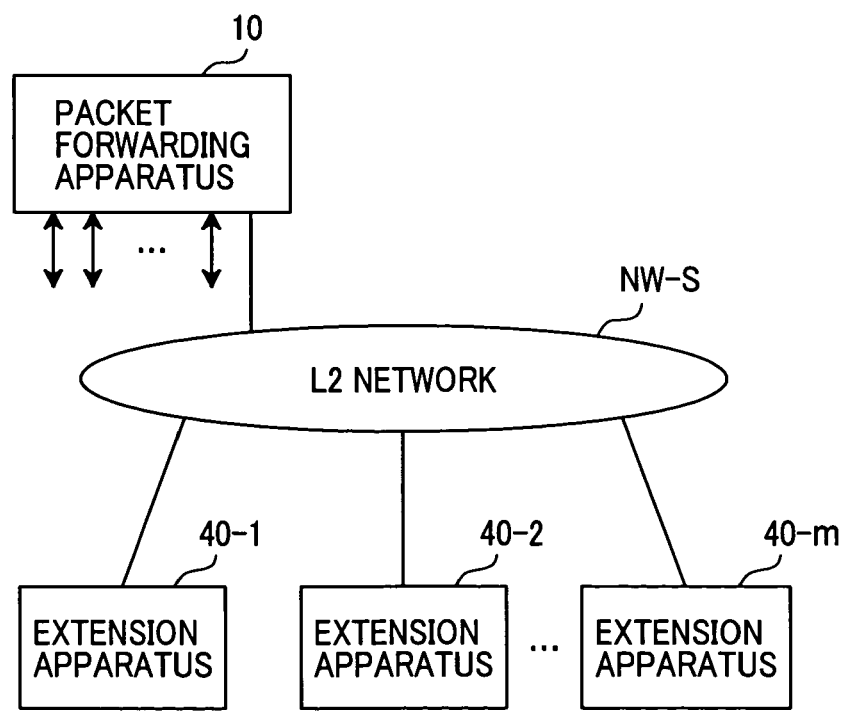
FIG. 16 is a view showing an example of a switching table 47 provided in the IPv6 extension apparatus 40 of FIG. 14.
FIG. 17 is a view showing another embodiment of the packet forwarding apparatus 10 according to the present invention.

FIG. 16 shows an example of the switching table 47.

The switching table 47 is composed of a plurality of table entries 470-1, 470-2, . . . each indicating the relationship between a source L2 address 471 and a table ID 472.

Upon receiving a packet PK3 having the extension L2 header shown in FIG. 2 from the packet forwarding apparatus 1-*i* (i=1 to m), the IPv6 extension apparatus 40 searches the switching table 47 for the table ID 472 by using the source L2 address in the extension L2 header as a search key and executes the IPv6 packet processing routine 500 illustrated in FIG. 12 by using the ingress packet classifier table 45-*k* and the IPv6 routing table 46-*k* each in the pair specified by the value k of the retrieved table ID 472.

Specifically, the IPv6 routing unit 44 reads out a packet from the ingress buffer 42 in Step 501, extracts the source L2 address 84D from the extension L2 header 84 of the ingress packet, searches the switching table 47 for an entry having the source L2 address 471 which matches the extracted source L2 address 84D, thereby to determine the value k of the table ID 472 corresponding to the packet forwarding apparatus as the packet source.

The IPv6 routing unit 44 uses the ingress packet classifier table 45-*k* or the IPv6 routing table 46-*k* specified by the value k of the table ID in Steps 504, 509, and 512 for table searching in the IPv6 packet processing routine 500.

By thus switching the table necessary for the IPv6 routing in accordance with the source address of the ingress packet PK3, the single IPv6 extension apparatus 40 can be shared by the plurality of packet forwarding apparatus 10. Since the timing of determining the value k of the table ID 472 is not limited if it is before the ingress packet classifier table 45-*k* or the IPv6 routing table 46-*k* is actually referred to, the extraction of the source L2 address 84D and the searching of the switching table 47 described above may be performed appropriately in an arbitrary one of Steps 501 to 503 of FIG. 12.

Embodiment 3

FIG. 17 shows a third embodiment of the packet forwarding apparatus 10.

The third present embodiment allows the function of the packet forwarding apparatus to be extended stepwise by connecting a plurality of extension apparatus 40-1 to 40-*m* to the same packet forwarding apparatus 10 via the L2 network NW-S. In order to implement the present embodiment, it becomes necessary for the egress packet processing unit connected to the extension INF of the packet forwarding apparatus 10 to impart the function of switching the extension apparatus serving as the destination depending on the type of the egress packet.

FIG. 18 shows the structure of the egress packet processing unit 14-*i* of the packet forwarding apparatus 10 suitable for use in the present embodiment. In the present embodiment, a packet destination switching table 45 is prepared in the egress packet processor 33 so as to switch the destination of the packet PK3 with the extension header.

In the packet destination switching table 45, a plurality of table entries each indicating the relationship between, e.g., the egress packet processing ID 351 and the destination L2 address 352 are registered, as shown in FIG. 19. The number of the table entries to be registered depends on the number of the extension apparatus 40 used by the packet forwarding apparatus 10.

Figure 20:
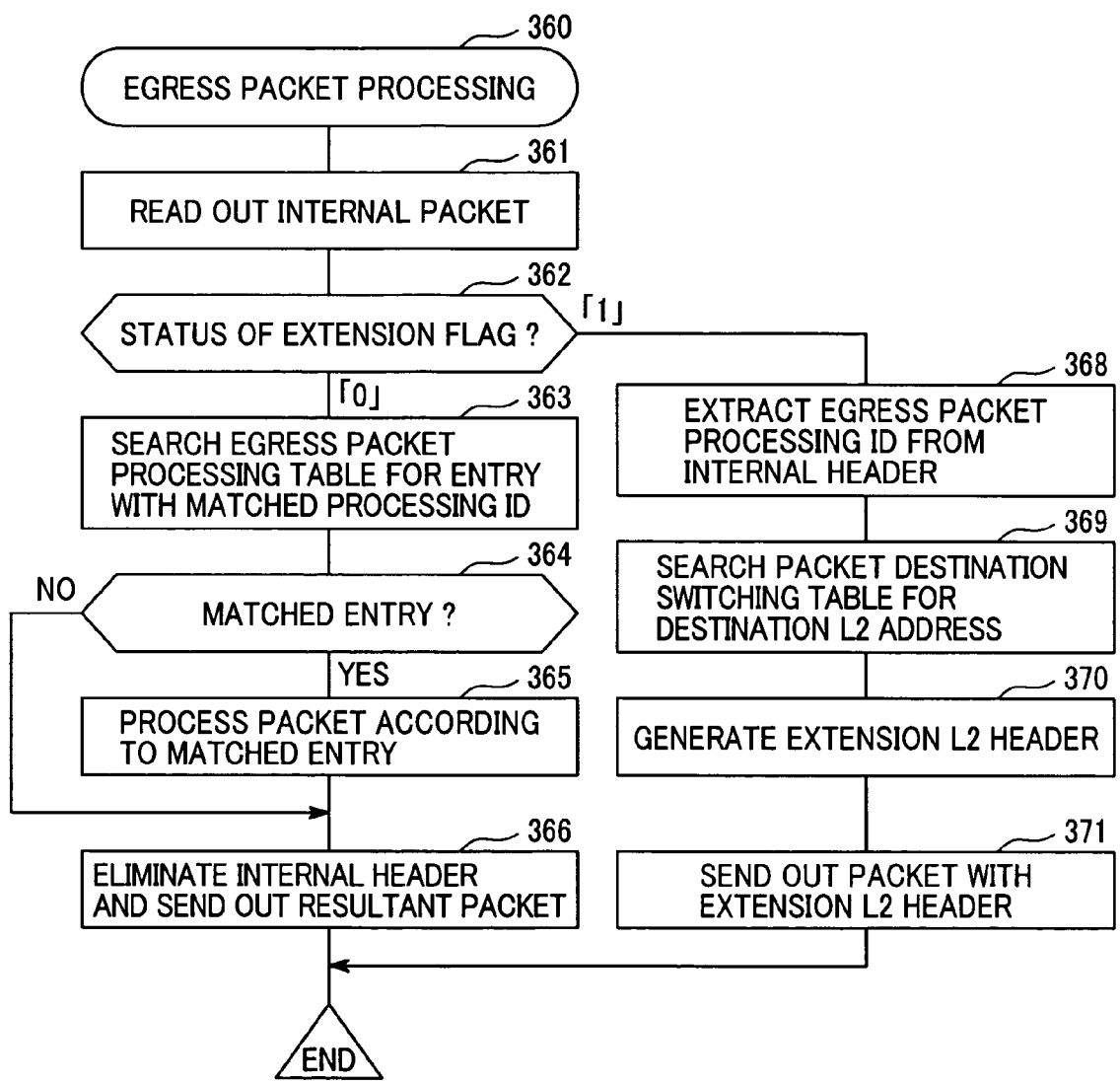
FIG. 20 is a flow chart of the egress packet processing routine 360 to be executed by the egress packet processor 33 shown in FIG. 18.

FIG. 20 shows a flow chart of the egress packet processing routine 360 to be executed by the egress packet processor 33 shown in FIG. 18. Steps 361 to 366 are the same as in the first embodiment illustrated in FIG. 8.

In the egress packet processor 33 of the egress packet processing unit 14-*n* which is provided in association with the egress line interface 12-*n* connected to the L2 network NW-S, the extension flag has been set to "1". In the present embodiment, upon recognizing that the extension flag is "1", the egress packet processor 33 extracts the egress packet processing ID 833 from the internal header 83 of an internal packet read out from the buffer memory 32 (Step 368) and searches the packet destination switching table 35 for the value of the destination L2 address 352 corresponding to the egress packet processing ID 833 used as a search key (Step 369).

In the first embodiment, the extension L2 header is generated using the source L2 address and the destination L2 address specified by the registers 334 and 335, respectively. In the present embodiment, by contrast, the egress packet processor 33 generates the extension L2 header by using the source L2 address indicated by the register 334 and the destination L2 address 352 retrieved from the packet destination switching table 35 (Step 370) and sends out the packet PK3 having the extension L2 header to the egress line interface 12-*n* (Step 371).

In the case where a plurality of extension apparatus are connected to the single packet forwarding apparatus 10 as in the present embodiment, the plurality of table entries which are the same in number as the extension apparatus may be registered appropriately in the ingress packet classifier table 24 of the ingress packet processing unit 13 and the type of the ingress packet to be forwarded to the extension apparatus may be identified appropriately based on the packet conditions for extended processing 241, whereby selective use is allowed.

Embodiment 4

Although each of the first to third embodiments has the configuration in which the extension flag registers 221 and 331 are disposed in each of the ingress packet processing units 13 (ingress packet processors 22) and each of the egress packet processing units 14 (egress packet processors 33), respectively, easy switching between the regular INF and the extension INF is enabled by holding the contents of these extension flag registers in a tabular form in the controller 15.

Figure 21:
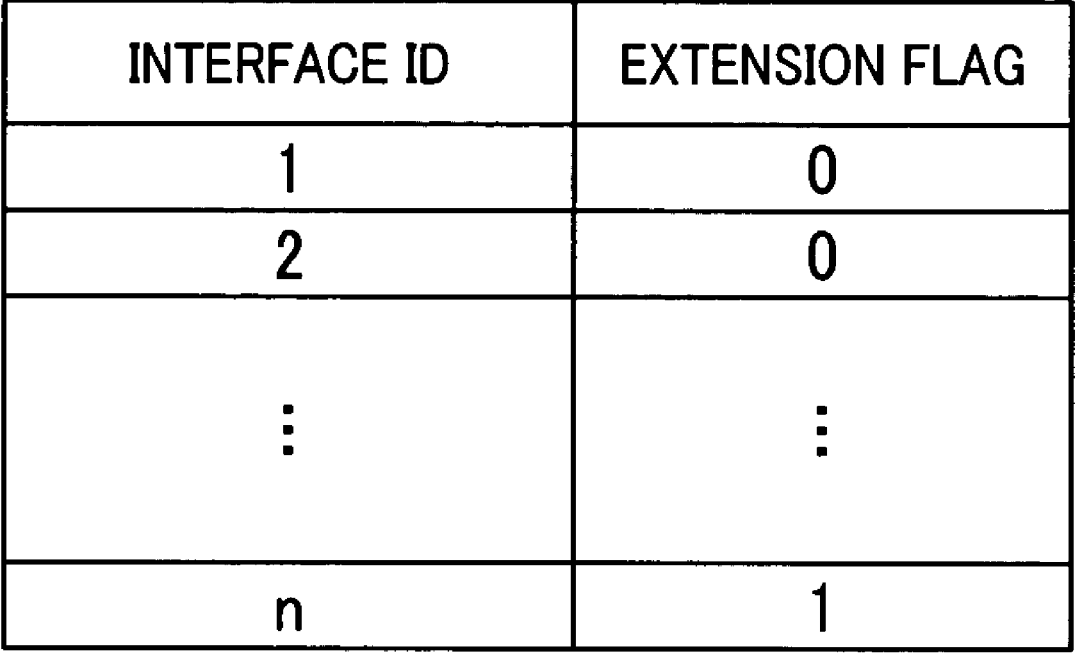
FIG. 21 is a view showing an example of an extension flag table 150 provided in a controller 15 in still another embodiment of the packet forwarding apparatus according to the present invention.

FIG. 21 shows an example of the extension flag table 150 provided in the controller 15.

The extension flag table 150 is composed of a plurality of table entries, which are the same in number as the network interfaces (the pairs of the ingress line interfaces 11-*i* and the egress line interfaces 12-*i*). Each of the entries indicates the relationship between the interface ID 151 and the extension flag 152. By searching the extension flag table 150 for an entry by using the interface ID k as a search key, the statuses of the extension flags of the ingress packet processing unit 13-*k* and the egress packet processing unit 14-*k* can be determined. In addition, the operator of the control terminal equipment 90 can switch the function of each of the egress/ingress packet processing units 13-*k* and 14-*k* by referring to the contents of the extension flag table 150 of the controller 15 and changing the status of the extension flag 152 corresponding to the specified interface ID k.

In the case where the controller 150 is provided with the extension flag table 150 as in the present embodiment, it is also possible to exclude the extension flag registers 221 and 331 from the ingress and egress packet processing units 13 and 14 and to adapt the ingress packet processor 22 and the egress packet processor 33 to refer to the extension flag table 150 and determine the statuses of the respective extension flags thereof.

What is claimed is:

1. A packet forwarding apparatus for controlling packet forwarding in conjunction with at least one functional extension apparatus, the packet forwarding apparatus comprising:

a plurality of network interfaces each composed of an ingress line interface and an egress line interface;

a plurality of ingress packet processing units provided in association with the ingress line interfaces to convert ingress packets received from the ingress line interfaces to internal packets each having an internal header including an identifier of the corresponding ingress line interface and a next-hop identifier and send out the internal packets;

a plurality of egress packet processing units provided in association with the egress line interfaces; and an internal packet forwarding unit for forwarding the output each of the internal packets Output from each of the ingress packet processing units to one of the egress packet processing units specified by the next-hop identifier included in the internal header thereof, wherein one of the network interfaces has been designated as an extension interface connected to the functional extension apparatus, each of the ingress packet processing units provided in association with the network interfaces other than the extension interface has a function of adding the internal header including the next-hop identifier indicating the extension interface to one of the ingress packets which matches a pre-specified header condition and a function of sending out the ingress packet having the internal header as one of the internal packets to the internal packet forwarding unit, one of the egress packet processing units which is provided in association with the extension interface adds an external network header including an address of the extension apparatus as a destination address to the internal packet received from the internal packet forwarding unit and sends out the internal packet having the external network header as an egress packet to a corresponding egress line interface, and one of the ingress packet processing units which is provided in association with the extension interface eliminates the external network header from a packet which is received from the corresponding ingress line interface and has been processed in the extension apparatus: and sends out the resultant packet as one of the internal packets to the internal packet forwarding unit.

2. The packet forwarding apparatus according to claim 1, wherein each of the ingress packet processing units provided in association with the network interfaces other than said extension interface has an ingress packet classifier table indicating a relationship between an identification condition for the ingress packet to be forwarded to the extension interface and a next-hop identifier, adds the internal header including the next-hop identifier indicated by said ingress packet classifier table to an ingress packet which matches said identification condition, and sends out the ingress packet having the internal header as the internal packet to said internal packet forwarding unit, and each of the egress packet processing units provided in association with the network interfaces other than said extension interface eliminates the internal header from the internal packet received from said internal packet forwarding unit and sends out the resultant packet as an egress packet to the corresponding egress line interface.

3. The packet forwarding apparatus according to claim 2, wherein each of said ingress packet processing units and each of said egress packet processing units stores flag information indicating whether the network interface provided in association therewith is the extension interface, and switches, in accordance with a status of the flag information, a processing mode for ingress packets received from the corresponding ingress line interface and the internal packet forwarding unit.

4. The packet forwarding apparatus according to claim 3, wherein each of said ingress packet processing units has a routing table indicating a relationship between the destination address of the ingress packet and the next-hop identifier and eliminates, when said flag information indicates an extension mode, the external network header from the ingress packet received from said ingress line interface or refers to, when said flag information indicates a regular mode, said ingress packet classifier table to judge whether the ingress packet matches said identification condition and converts a packet which matches the identification condition to one of the internal packets having the internal header including the next-hop identifier indicated by the ingress packet classifier table or converts a packet which does not match the identification condition to one of the internal packets having the internal header including the next-hop identifier retrieved from said routing table.

5. The packet forwarding apparatus according to claim 2, wherein each of the ingress packet processing units provided in association with the network interfaces other than said extension interface has the ingress packet classifier table composed of a plurality of table entries each indicating a relationship between the identification condition for the ingress packet to be forwarded to the extension interface and the next-hop identifier, and plural ones of said network interfaces are designated as the extension interfaces.

6. The packet forwarding apparatus according to claim 2, wherein each of the ingress packet processing units provided in association with the network interfaces other than said extension interface has the ingress packet classifier table composed of a plurality of table entries each indicating relationships among the identification condition for the ingress packet to be forwarded to the extension interface, the next-hop identifier, and an egress packet processing identifier, adds the internal header including the next-hop identifier and the egress packet processing identifier each indicated by said ingress packet classifier table to one of ingress packets which matches said identification condition, and sends out the ingress packet having the internal header as the internal packet to said internal packet forwarding unit, and the egress packet processing unit provided in association with said extension interface has a destination switching table indicating a relationship between an egress packet processing identifier and a destination address, adds an external network header including a destination address retrieved from said destination switching table and corresponding to the egress packet processing identifier indicated by the internal packet to the internal packet received from said internal packet forwarding unit, and sends out the internal packet having the external network header as the egress packet to the corresponding egress line interface.

7. The packet forwarding apparatus according to claim 1, wherein each of the ingress line interfaces other than said extension interface sends out the ingress packet having the external network header, and the input packet processing unit provided in association with said ingress line interface adds the internal header including the identifier of the ingress line interface, the next-hop identifier, and an egress packet processing identifier to said ingress packet and sends out the ingress packet having the internal header as one of the internal packets to said internal packet forwarding unit, the internal header of a packet received by said extension interface from an external network includes an egress packet processing identifier indicating no need for address conversion, and each of the egress packet processing units provided in association with the network interfaces other than said extension interface checks the internal header of one of the internal packets received from said internal packet forwarding unit and sends out, when the egress packet processing identifier indicates no need for address conversion, the ingress packet from which the internal header has been eliminated as the egress packet or converts, when the egress packet processing identifier specifies address conversion, an address in the external network header included in the ingress packet and sends out the ingress packet from which the internal header has been eliminated as the egress packet.

* * * * *

UNITED STATES PATENT AND TRADEMARK OFFICE
CERTIFICATE OF CORRECTION

PATENT NO. : 7,606,148 B2
APPLICATION NO. : 11/285363
DATED : October 20, 2009
INVENTOR(S) : Toumura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Fifth Day of October, 2010

David J. Kappos
*Director of the United States Patent and Trademark Office*